United States Patent [19]
Ernst et al.

[11] 4,108,503
[45] Aug. 22, 1978

[54] LINEAR MOTION BALL BEARING

[75] Inventors: Horst Manfred Ernst, Eltingshausen; Armin Olschewski; Lothar Walter, both of Schweinfurt; Manfred Brandenstein, Aschfeld, all of Germany

[73] Assignee: SKF Kugellagerfabriken GmbH, Schweinfurt, Germany

[21] Appl. No.: 779,692

[22] Filed: Mar. 21, 1977

[30] Foreign Application Priority Data

Mar. 26, 1976 [DE] Fed. Rep. of Germany ....... 2612936

[51] Int. Cl.² ............................................. F16C 31/06
[52] U.S. Cl. ............................................. 308/6 C
[58] Field of Search ............... 308/6 C, 6 R, 4 R, 199, 308/201; 29/148.4 R, 148.4 B, 148.4 C, 149.5 C

[56] References Cited

U.S. PATENT DOCUMENTS

| | | | |
|---|---|---|---|
| 2,897,582 | 8/1959 | Blazek et al. | 29/148.4 C |
| 3,042,459 | 7/1962 | Magg | 308/6 C |
| 3,265,449 | 8/1966 | Jahn | 308/6 C |

*Primary Examiner*—Trygve M. Blix
*Assistant Examiner*—Charles E. Frankfort
*Attorney, Agent, or Firm*—Daniel M. Rosen

[57] ABSTRACT

A linear motion ball bearing including an outer sleeve, a cylindrical ball-retaining cage within the sleeve, with continuous raceways defined between the sleeve and cage, and a plurality of balls in these raceways; the sleeve including, as part of each raceway, an axial return race defined by a slot. The cage has a corresponding and generally adjacent axial race, the cage, in an assembled bearing, being rotated about its central axis and displaced relative to the sleeve, so that balls in the axial race are engaged and retained by an edge of the slot.

4 Claims, 4 Drawing Figures

LINEAR MOTION BALL BEARING

BACKGROUND OF THE INVENTION

The present invention is in the field of linear motion ball bearings, each consisting of a cage with a plurality of ball guides or raceways distributed over its periphery, each guide having two straight races running parallel to the axis of the bearing and two semicircular turn-around races connecting the axial races, and of a thin-walled cylindrical sleeve slipped over the cage, which sleeve is provided in the region of one of the straight races in each raceway, with a radially continuous longitudinal slit.

Ball bearings of this type include outer sleeves, and are also known as ball bushings or drawn cup linear bearings. They have continuous longitudinal slits in the unloaded zone of the raceways, these slits having widths smaller than the diameter of the balls as disclosed in DT-AS No. 1,262,691 which corresponds to U.S. Pat. No. 3,464,745. These prior art bearings have the disadvantage that the balls must be inserted in the cage prior to assembly of the bearing, the cage with deformation then being slipped into the sleeve with the balls. These bearings have the further disadvantage that the balls in the straight return zone have metallic contact with the sleeve on both sides of the longitudinal slit, which leads to wear and also produces noise.

One object of the present invention is to provide a ball bearing of the type initially mentioned which lends itself to assembly in simple fashion, and in which wear and noise are largely eliminated.

SUMMARY OF THE INVENTION

The object of this invention, to reduce noise and wear, is achieved by virtue of each continuous longitudinal slit in the sleeve having a width equal to or greater than the diameter of the balls, and by the cage being slightly twisted in relation to the sleeve such that each straight race is displaced in the cage in relation to the corresponding longitudinal slit, and the balls of the return zone rest against only one edge of the continuous longitudinal slit.

By this design, pursuant to the invention, it is possible to simplify the assembly of the bearing such that little effort need be expended and deformation of the parts is prevented. At the same time, assembly may be undertaken in such manner that first the cage is slipped into the sleeve, the longitudinal slits being caused to coincide in each instance with a straight race in the cage. Then the balls are fed from the outside into the individual races through the longitudinal slits. After filling, the cage is twisted slightly in relation to the sleeve, until the balls come to rest against one edge of the longitudinal slit, whereupon the cage and sleeve are fixed against one another in this position. The cage is moreover designed such that it's return race, together with one of the edges of the guide slit against which the balls travel, prevents the balls from dropping out. This may be done, according to an additional feature of the invention, by the arrangement of a nose or a projection at one edge of the straight return race in the cage.

According to a further feature of the invention, the sleeve has at both ends, in the region of the semicircular races, an inside diameter which is greater than in the mid-section of the sleeve. This ensures that the balls in the turn-around zone, that is, in the semicircular races, are in load-free contact with the sleeve and the cage, so that turn-around may proceed smoothly. Also, the development of wear and noise in this region is largely prevented with the use of synthetic material for the cage. According to another feature of the present invention it is possible to provide, in the region of the semicircular races, segmental recesses which are set back in relation to the inside bore in the midsection of the sleeve corresponding to the ring-shaped recess at the ends.

A preferred embodiment of the present invention will be described in greater detail below with the aid of the accompanying drawings.

DETAILED DESCRIPTION OF THE PREFERRED EMBODIMENT

Figure 1:
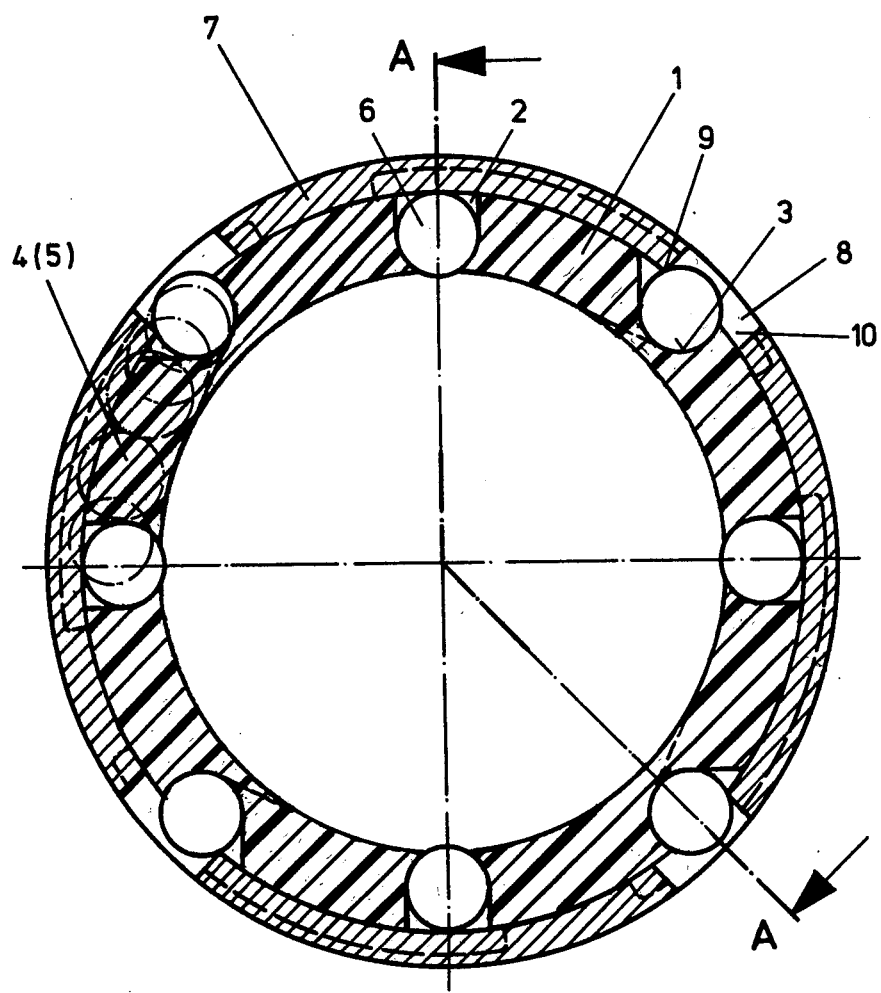
FIG. 1 shows the cross-section of a ball bearing pursuant to the invention.
Figure 2:
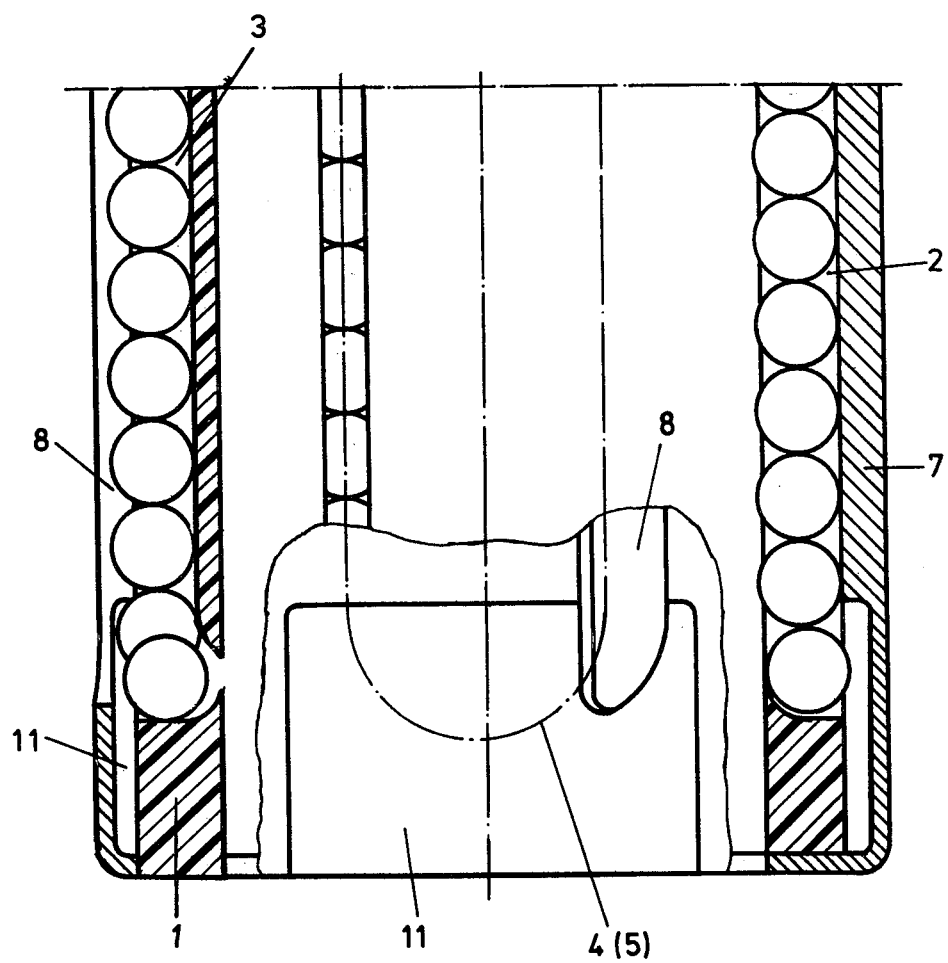
FIG. 2 shows a portion of the longitudinal section through the ball bearing along line A—A of FIG. 1, while a portion of the cage has been omitted for better illustration.

The ball bearing for longitudinal motion represented in FIGS. 1 and 2 has a cage 1, which is provided on the periphery with a plurality of ball guides or raceways, each of which consists of two straight races 2 and 3 running parallel to the bearing axis and two semicircular or turn-around races 4 and 5 connecting the ends of the straight races. The race 2 includes the balls 6 of the loaded zone, while in the race 3, displaced radially outward, are arranged the balls of the unloaded zone or the return zone. Over the cage 1 is slipped a thin-walled cylindrical sleeve 7, which in the region of each return race 3 has a continuous longitudinal slit which extends radially through the sleeve. These longitudinal slits 8 have a width which is equal to or greater than the diameter of the balls 6. As may be seen particularly in FIG. 1, the cage 1 is rotated about its axis relative to the sleeve 7 such that the straight race 3 is displaced in the cage in circumferential direction in relation to the longitudinal slit 8, while the balls 6 in this race 3 come to rest against only one edge 9 of the longitudinal slit 8. In order to prevent the balls 6 from falling out of the race 3, the cage has a projecting edge 10 in the region of the race 3. In the region of the semicircular races 4 and 5, the sleeve 7 is provided with a plurality of segmental recesses or cut-away spaces 11 distributed on the periphery, to ensure load-free turn-around. It is possible to design these recesses so low that the cage with retaining projections serves as the exclusive guide means for balls in this region.

Figure 3:
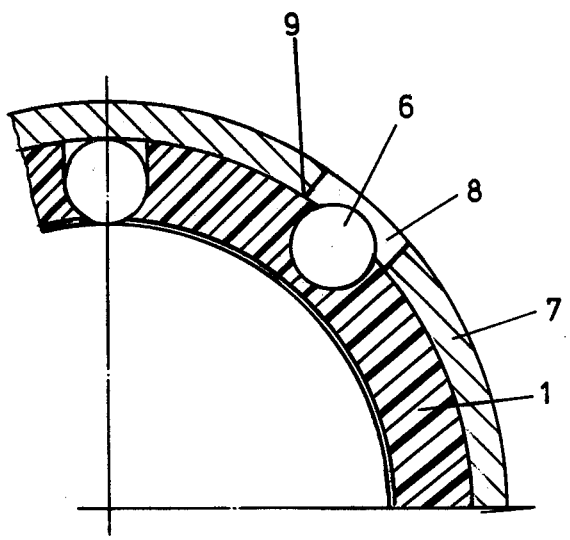
FIG. 3 shows a portion of the cross-section of FIG. 1 at the time of assembly of the bearing.

FIG. 3 shows the ball bearing pursuant to the invention at the time of assembly. The cage 1 is slipped into the sleeve 7 such that the balls may be inserted from the outside in through the slits 8. After insertion of the balls 6, the cage and sleeve are rotated relative to and against one another until the balls come to rest against one edge 9 of the longitudinal slit 8 (see FIG. 1). The cage and sleeve are then fixed to one another in this position. This fixing may be accomplished by projections on the cage or on the sleeve engaging corresponding recesses of the opposing member. Another possibility for obtaining this torsional security is by flanging certain parts, or in some other known manner.

Figure 4:
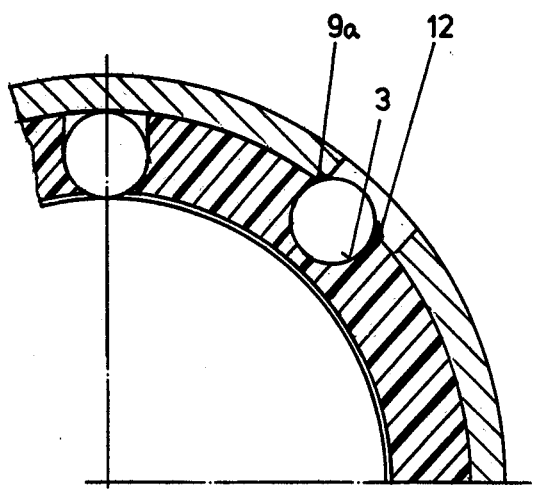
FIG. 4 shows a portion of the cross-section of a linear motion ball bearing in modified form.

In the embodiment of FIG. 4, the cage is provided in the region of the race 3, with a projecting nose 12, which, particularly in the case of balls of fairly small diameter, results in better support to prevent the balls from falling out. In this example the edge 9a is moreover bevelled or cut-away in order to ensure smoother and wear-free travel of the balls in the return race.

The present invention is not limited to the embodiments described above. Rather, it is possible to undertake modifications of design within the scope and spirit of the invention.

What is claimed is:

1. In a linear motion ball bearing operable with a shaft, the bearing including an outer sleeve, a ball retaining cage situated within the sleeve, the cage having a plurality of continuous raceways each of which comprises axial loaded and unloaded return races, and curved turn-around races connecting the adjacent ends of said axial races, and a plurality of balls substantially filling said raceways, the sleeve including in the region of each of said unloaded return races a slot extending axially and radially through the sleeve, said slot defined by spaced edges, the improvement in combination therewith wherein said slot has a width at least equal to the diameter of said balls, and said cage and sleeve are relatively rotated about their common longitudinal axis such that balls in said unloaded return race of the cage are engaged by only one edge of said slot which thereby defines with said unloaded return race a space having a width less than said ball diameter, whereby said balls are prevented from falling out of said unloaded return portion of said raceway.

2. A bearing according to claim 1, wherein each of said unloaded return races in the cage comprises parallel edges, and one of these edges comprises a projection along its length extending toward the other edge, said projection cooperating with said slot edge to prevent said balls from falling out of this return portion of the raceway.

3. A bearing according to claim 1, wherein said sleeve has in the region of both turn-around races of each raceway an adjacent surface that is radially recessed to define clearance space between said recessed surface and balls adjacent thereto.

4. A bearing according to claim 1, wherein said sleeve further comprises in the regions of both turn-around races segmental recesses having surfaces radially spaced from balls only in said turn-around races to permit free movement of the balls therethrough.

* * * * *